United States Patent [19]
Durham et al.

[11] Patent Number: 5,737,614
[45] Date of Patent: Apr. 7, 1998

[54] DYNAMIC CONTROL OF POWER CONSUMPTION IN SELF-TIMED CIRCUITS

[75] Inventors: Christopher McCall Durham; Peter Juergen Klim, both of Austin, Tex.

[73] Assignee: International Business Machines Corporation, Armonk, N.Y.

[21] Appl. No.: 671,189

[22] Filed: Jun. 27, 1996

[51] Int. Cl.$^6$ .................................................. G06F 1/32
[52] U.S. Cl. ............................................... 395/750.04
[58] Field of Search .......................... 395/750, 750.04

[56] References Cited

U.S. PATENT DOCUMENTS

| | | | |
|---|---|---|---|
| 4,093,871 | 6/1978 | Plumb et al. | 307/106 |
| 4,716,551 | 12/1987 | Inagaki | 365/222 |
| 4,766,567 | 8/1988 | Kato | 364/900 |
| 4,980,851 | 12/1990 | Komori et al. | 364/900 |
| 5,073,838 | 12/1991 | Ames | 361/103 |
| 5,222,239 | 6/1993 | Rosch | 395/750 |
| 5,361,060 | 11/1994 | Onozaki | 340/825.02 |
| 5,373,204 | 12/1994 | Muramatsu et al. | 326/93 |
| 5,465,367 | 11/1995 | Reddy et al. | 395/750 |
| 5,483,102 | 1/1996 | Neal et al. | 395/750 |
| 5,572,453 | 11/1996 | Miyake et al. | 364/736 |
| 5,574,352 | 11/1996 | Endo et al. | 318/802 |
| 5,576,643 | 11/1996 | Kobayashi et al. | 326/94 |
| 5,590,061 | 12/1996 | Hollowell, II et al. | 395/750 |
| 5,628,001 | 5/1997 | Cepuran | 395/556 |

FOREIGN PATENT DOCUMENTS 06175956  6/1994  Japan.

OTHER PUBLICATIONS

IBM Technical Disclosure Bulletin, vol. 38, No. 5, May, 1995, pp. 465–468, "Differential Current Switch Data Interface to an EDA Drive Bipolar Embedded Array".

IBM Technical Disclosure Bulletin, vol. 38, No. 1, Jan., 1995, pp. 27–34, "Algorithm for Incremental Timing Analysis".

IBM Technical Disclosure Bulletin, vol. 33, No. 12, May, 1991, pp. 439–441, "Efficient Power–Supply Decoupling Scheme for Dynamic Rams".

IBM Technical Disclosure Bulletin, vol. 29, No. 10, Mar., 1987, pp. 4527–4528, "Infrared Transmitter with Dual Power Levels".

IBM Technical Disclosure Bulletin, vol. 22, No. 1, Jun., 1979, pp. 142–143, "Cache Bit Selection Circuit".

IBM Technical Disclosure Bulletin, vol. 22, No. 1, Jun., 1979, pp. 140–141, "Cache Bit Selection Circuit".

*Primary Examiner*—Ayaz R. Sheikh
*Assistant Examiner*—David A. Wiley
*Attorney, Agent, or Firm*—Mark E. McBurney

[57] ABSTRACT

A system and method are provided which automatically change the rate of data transfer between stages of control logic connected in a pipelined fashion, based upon a control signal generated by a sensor which determines the power consumption of the integrated circuit. Delay circuits are disposed intermediate of each stage in the pipeline and receive an input from the sensor which is connected to the delay circuits. The data input to the next subsequent stage from the previous stage in the pipeline is gated based on the state of the delay circuitry. That is, when the sensor determines that a high power condition exists, the delay circuitry is enabled such that the data transfer between stages in the pipeline slows down. However, when the sensor determines that the power consumption situation is at an acceptable level, the delay circuitry is disabled such that data can then be transferred between stages in the pipeline at a high frequency.

13 Claims, 5 Drawing Sheets

DYNAMIC CONTROL OF POWER CONSUMPTION IN SELF-TIMED CIRCUITS

BACKGROUND OF THE INVENTION

The present invention generally relates to the dynamic regulation of power consumption in self-timed circuits. More particularly, the present invention regulates the frequency in order to control power consumption in very high frequency self-timed circuits having plural pipeline stages.

For complementary metal-oxide semi-conductor (CMOS) high performance computing systems having very high frequency rates, high data throughput is essential. In systems having clocked signals, high clock rates are commonplace, while in emerging self-timed or asynchronous systems the rate of data transitions through various stages of control logic are increased. For both implementations, the power consumption rises proportionally to the frequency. Power consumption is also directly related to the heat which is generated by the high speed circuitry. Current chip packaging designs recognize that the total permissible heat dissipation of a chip is limited and that severe performance limitations arise if the problem of heat dissipation is not addressed. One conventional solution is to conserve power by shutting down, or turning off idle circuitry during specific operations. However, a problem arises when these specific operations require all of the circuitry to be on in order to perform the specific operations. Further, in some cases even with certain functions (circuitry) shut down, the power dissipation needs may exceed the limits of the thermal characteristics of the package, such as multi-chip module (MCM), single chip module (SCM), or the like. Therefore, it can be seen that a solution is needed which will reduce the power input to the package without interrupting data processing operations and destroying valid data.

SUMMARY OF THE INVENTION

In contrast to the prior art, the present invention automatically changes the rate of data transfer between stages of control logic connected in a pipelined fashion. The data transfer rate is controlled based upon a control signal generated by a sensor which determines the power consumption of the integrated circuit. Delay circuits are disposed intermediate of each of the stages in the pipeline and receive an input from the sensor which is connected to the delay circuits. The data input to the next subsequent stage from the previous stage in the pipeline is gated based on the state of the delay circuitry. That is, when the sensor determines that a high power condition exists, the delay circuitry is enabled such that the data transfer between stages in the pipeline slows down. However, when the sensor determines that the power consumption situation has regulated and is at an acceptable level, the delay circuitry is disabled such that data can then be transferred between stages in the pipeline at a high frequency.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

Figure 1A:
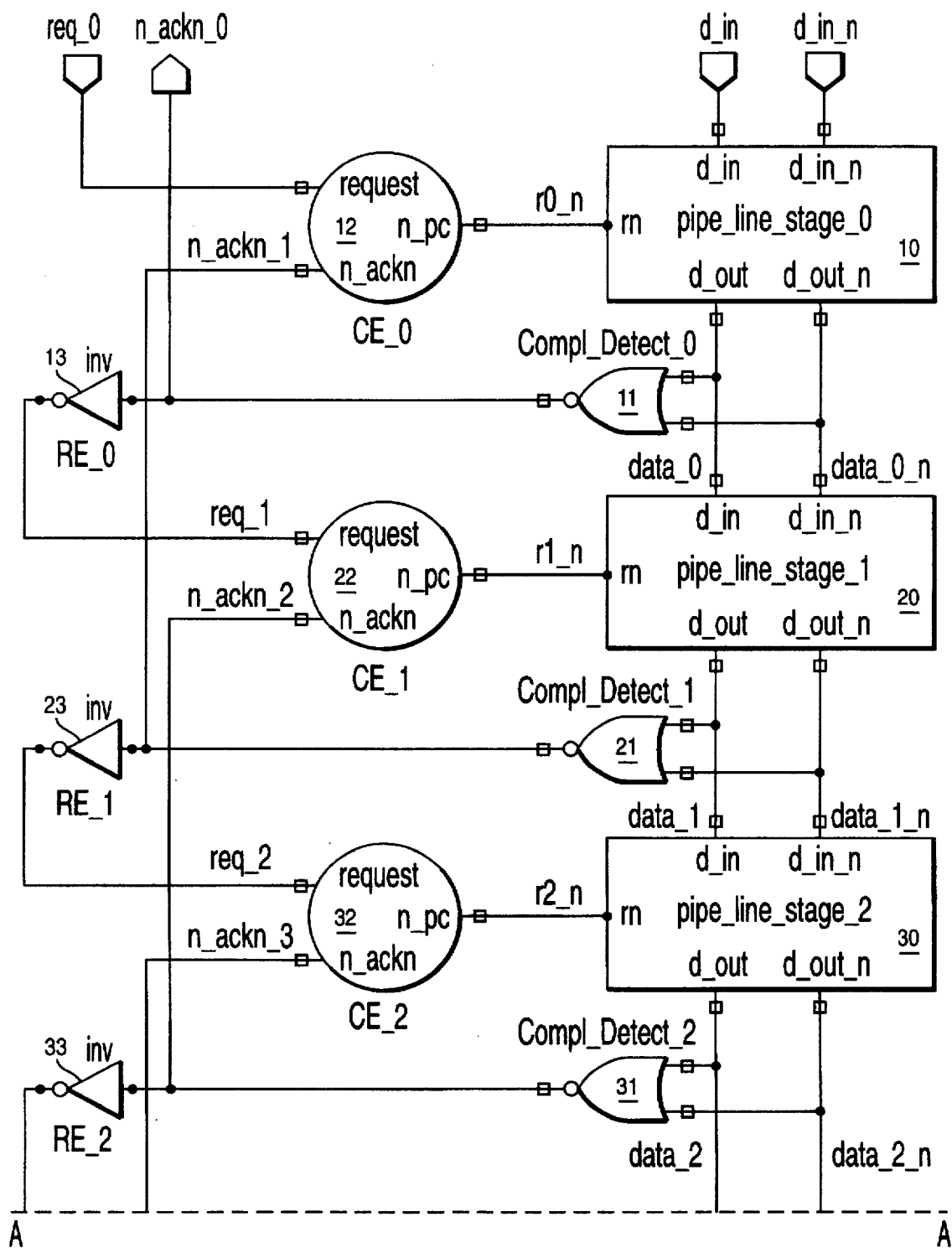
FIGS. 1a and 1b are schematic diagrams showing a pipeline with various stages each including various control circuitry utilized by various functions of an integrated circuit.
Figure 1B:
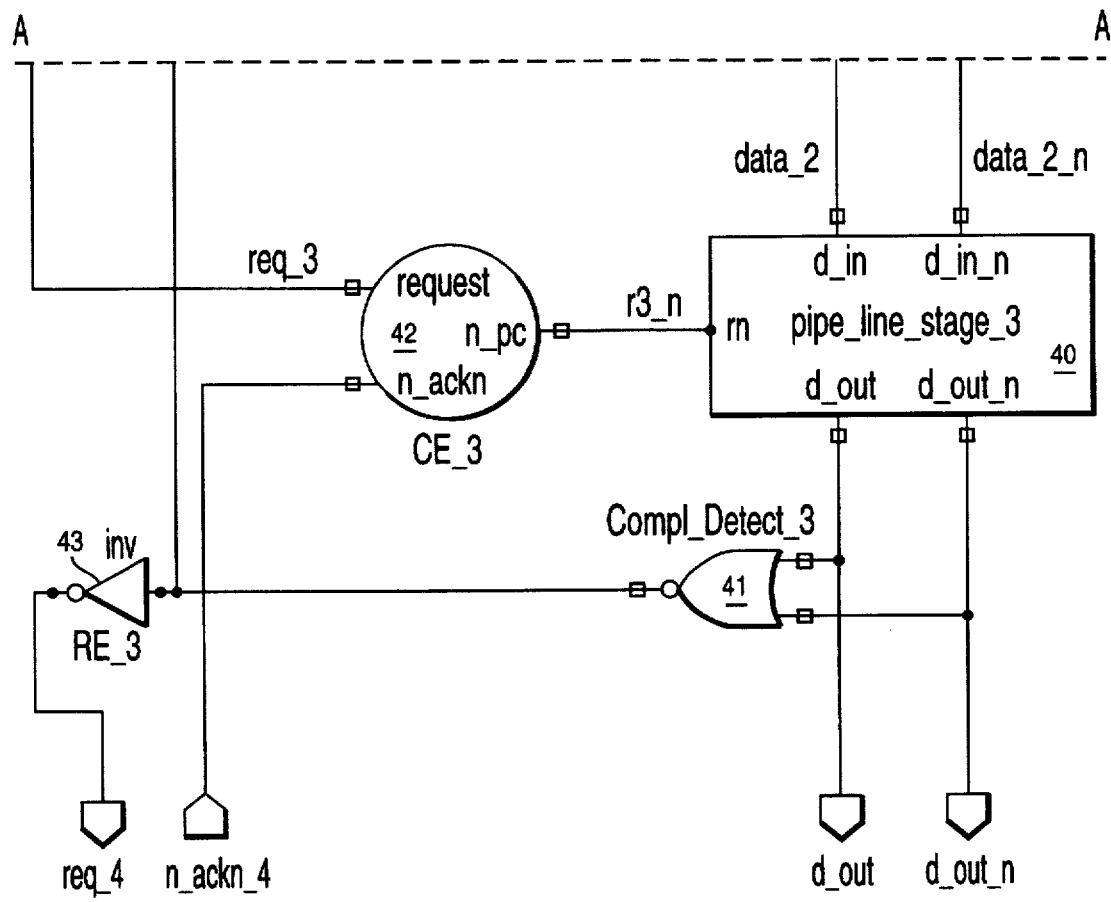

Referring to FIGS. 1a and 1b, a self-timed pipeline of four stages is shown. Of course, those skilled in the art will understand how the pipeline may include a variable number of stages depending on the function being implemented. Pipeline stage 0 is shown by reference 10 and subsequent stages 1, 2 and 3 are shown by reference numerals 20, 30 and 40, respectively. In self-timed systems, the forward path through the pipeline is controlled by circuits such as the Muller-C element to facilitate the handshake operation. Hence, the forward speed of data through the pipeline is a function of both the evaluation path and the control path, where the responsibility of the control path is to "hand-off" data to the next stage and also to control the frequency at which the data is transferred through the pipeline. Element 12 is a control element responsible for the hand-off between a previous stage and stage 10. It should be noted that the control elements, such as control element 12 include logic circuitry which output the reset signal "rn" based on the request and acknowledge signals. Many variations of logic circuits are available which provide the function implemented by control element 12. A request signal is input to element 12 which then forwards that request as signal "rn" (r0_n) to stage 10. The request signal is input from a prior stage, as mentioned previously. Once the control logic in stage 10 completes its manipulations of the data d_in and d_in_n, input thereto, new data d_out and d_out_n is output from stage 10. It should be noted that d_in and d_in_n are complementary signals. That is, when d_in is a logical 1 or 0, d_in_n will be a logical 0 or 1, respectively. Further, since the d_out and d_out_n signals are provided as d_in and d_in_n signals to a subsequent stage, the data out signals d_out and d_out_n are also complements of one another.

The data output signals d_out and d_out_n from stage 10 are also provided to a NOR-gate 11 which outputs an acknowledge signal (n_ackn_0) back to the previous stage which issued the initial request signal (req_0). The NOR gates 11, 21, 31, and 41 are completion detection circuits, Compl_Detect_0, Compl_Detect_1, Compl_Detect_2, Compl_Detect_3, respectively, for each of the stages 10, 20, 30 and 40. The truth table (where A and B are inputs and C is the output) for a NOR gate is as follows:

| A | B | C |
|---|---|---|
| 0 | 0 | 1 |
| 0 | 1 | 0 |
| 1 | 0 | 0 |
| 1 | 1 | 0 |

Since the output of each stage (d_out and d_out_n) are complementary, then the inputs A and B to the NOR gates of the circuit of FIG. 1 will always be either a logical 1 or a logical 0.

The output of, for example, NOR-gate 11 is provided to inverter 13 (in addition to previous stage n_ackn_0) which changes the output signal of the NOR gate to a request signal RE_0. This request signal is input to control element 22 for the next subsequent stage, as req__1, which requests that the data output from stage 10 be input to subsequent stage 20. Similarly, when stage 20 manipulates the data input thereto, the d__out signal and d__out__n signals are output from stage 20 to NOR-gate 21 which provides an acknowledgement, n__ackn__1 back to control element 12 of stage 10. The output of NOR-gate 21 is also provided to inverter 23 which sends a request signal req__2 to control element 32, associated with stage 30. Data output from stage 30 is provided to NOR-gate 31 which acknowledges, to stage 20 (via n__ackn__2), the completion of data manipulation by stage 30, and provides a request signal req__3 to control element 42 via inverter 33. The data from stage 30 is then input to stage 40 and, subsequent to its manipulation by stage 40, output to NOR-gate 41 which provides the acknowledge signal n__ackn__3 back to control element 32 and also provides the signal to inverter 43 such that a request req__4 is then sent to the next subsequent stage (not shown). In this manner, it can be seen, that data is provided in pipelined fashion through the various stages as shown in FIG. 1.

More particularly, the operation of the self-timed pipeline will now be described, assuming initially that the data input to each of stages 10, 20, 30 and 40 (d__in and d__in__n) is at a logical 0, i.e. a low level. It then follows that the acknowledge signals 0 through 3 are at a logical 1 and as a result, request signals 1 through 4 are low (logical 0). Further, the request input signals (r0__n through r3__n) are also low. At this point, it is also assumed that the input request signals are low and the input acknowledge signals are high. Given the previous conditions, the pipeline stages 10, 20, 30 and 40 are in a reset condition.

It should be noted that the circuit of FIGS. 1a and 1b is a dynamic or self-timed circuit. Therefore, at reset the input signals d__in and d__in__n are at logical zero, and output signals d__out and d__out__n are also at logical zero, since the output signals of one stage (e.g. stage 10) are the same as the input signals to the next stage in the pipeline (e.g. stage 20). But, once one of the outputs are evaluated, then the other becomes complementary. For example, at reset d__in and d__in__n are both equal to logical zero, however, once d__out is evaluated to be a logical one, then d__out__n is always a logical zero.

The NOR-gates 11, 21, 31, 41 will output a logical one when both d__out and d__out__n are a zero and a logical zero with either of the signals d__out and d__out__n are a logical one. Therefore, when the circuit is reset (both signals d__in and d__in__n are logical zero) NOR-gate 11 will output a logical one which sends an acknowledge signal to the previous stage. However, when one of the d__in or d__in__n signals are a logical one, then a logical zero is output from NOR-gate 11 and inverter 13 causes a logical one (active) to be input to control element 22 as req__1. In this case, since there is real data (evaluated) to be input to stage 20, from stage 10, a request signal is input to stage 20 and the data will be input to stage 20 as d__in and d__in__n.

Figure 2:
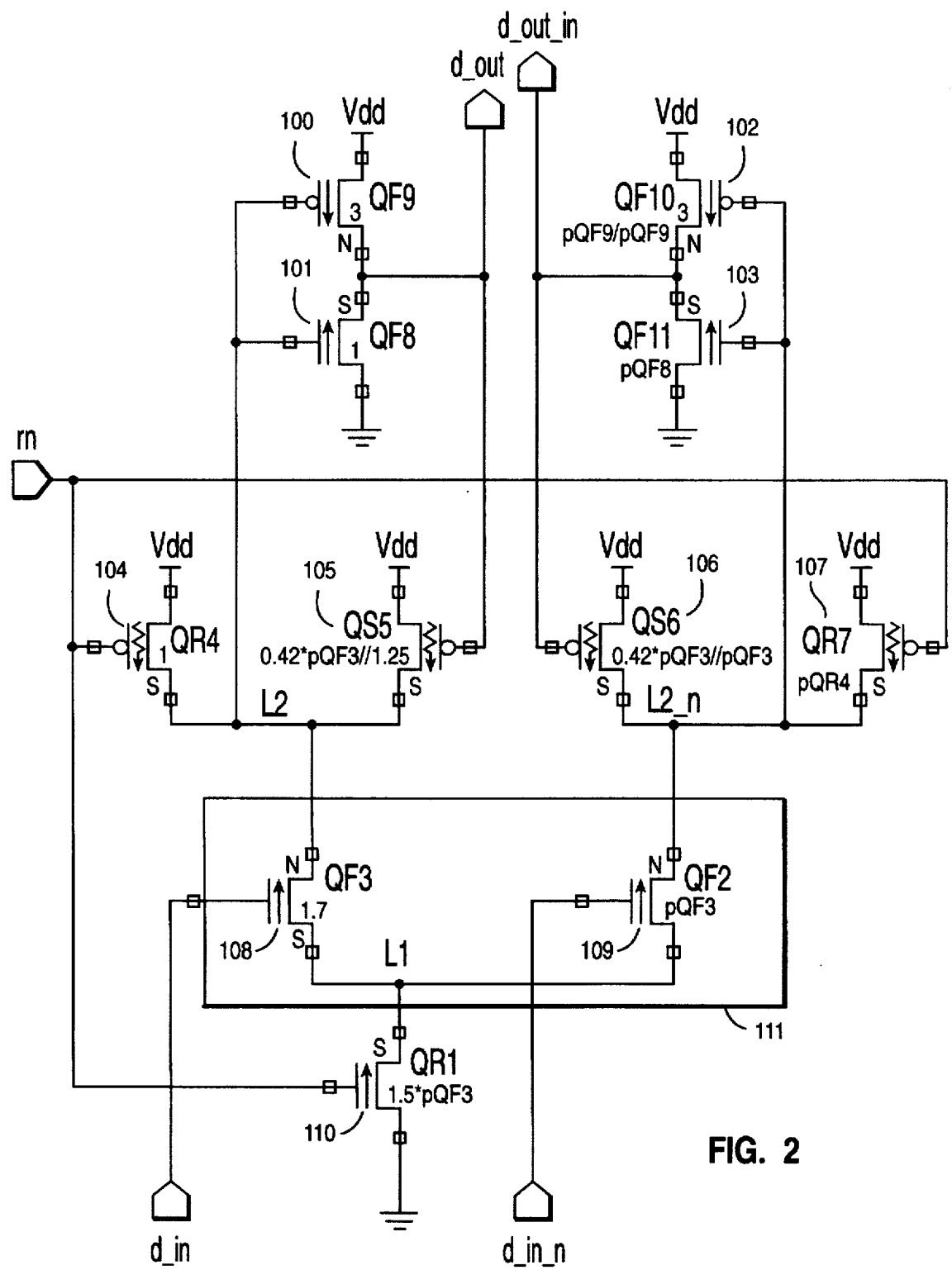
FIG. 2 is a detailed circuit diagram showing one of the stages in the pipeline of FIG. 1.

Referring to FIG. 2, the individual elements contained in each stage (10, 20, 30 and 40) will now be described. FIG. 2 is a general transistor level circuit diagram of a pipeline stage consisting of dual rail DCVS type circuits. FIG. 2 shows the logical function 111 of a stage in the pipeline as shown in FIGS. 1a and 1b. It should be noted that logical function 111 can be any one of a number of functions which manipulate data. By way of example, transistors 108 and 109 are shown and represent the logical function of a stage, e.g. stage 10, as shown in FIGS. 1a and 1b. The dual rail output inverter consists of transistors 100 and 101, as well as transistors 102 and 103. Those skilled in the art will recognize how P-type transistor 100 connected with N-type transistor 101 will form an inverter circuit such that the output as shown by d__out will be the complement of the input to transistors 100 and 101. Similarly, transistors 102 and 103 form an inverter such that the input to these transistors will be inverted prior to being output on d__out__n. The reset signal "rn" as shown in FIGS. 1a and 1b is also shown in FIG. 2 and connected to N-type transistor 110, and P-type transistors 104 and 107. When the rn signal is low (reset or precharge), a foot device embodied as transistor 110 is off and transistors 104 and 107 are turned on such that nodes L2 and L2__n are charged to Vdd. It can be seen that transistors 104 and 107 are P-type devices such that when rn is a logical 0, these devices will be turned on thus connecting Vdd to nodes L2 and L2__n. When nodes L2 and L2__n are at Vdd, then the inverters (transistors 100, 101 and 102, 103), will output a logical 0, i.e. N-type transistors 101 and 103 will be turned on and ground potential will be output as a low signal on signal lines d__out and d__out__n. In this case, no current can flow to ground through the logical tree because foot device, transistor 110, is off regardless of the inputs $d_{13}$ in and d__in__n. It can be seen that transistor 110 will be off (since it is an N-type device) when signal rn is 0, thus preventing current flow to ground through this device.

When a request line such as request line 0 (req__0) of FIGS. 1a and 1b goes high (a logical 1), the output of a control element, i.e. element 12 also goes high. In this case, the "rn" signal will be a logical 1, thus causing transistors 104 and 107 to be turned off, and transistor 110 to be turned on, since it is an N-type device and will conduct electricity when presented with a logical 1. At this state, the pipeline stage as represented by FIG. 2 is in a stand-by state and ready to receive data. Leakage current at nodes L2 and L2__n are compensated for by standby transistors 105 and 106 which are initially turned on when the data output d__out or d__out__n went low at the beginning of the precharge state. That is, when the inverters configured by transistors 101, 100 and 102, 103 output a logical 0, transistors 105 and 106 begin to conduct electricity and pull nodes L2 and L2__n to Vdd. The stage is now in a state where the dual rail input d__in or d__in__n may now go to a logical 1. At this point, transistor 108 or transistor 109 is turned on and conduct electricity, thereby discharging nodes L2 or L2__n, respectively. This causes these small standby transistors to be "overdriven" and the corresponding output inverter implemented by transistors 100, 101 or transistors 102, 103 switch the output to a high level (logical 1). More particularly, transistor 108 is overdriven such that L2 which is an input to transistor pair 100, 101, which make up an inverter circuit such that the ground potential is provided to the input of the inverter and a high level, logical 1, is then output on d__out. Similarly, transistor 109 is overdriven by ground potential such that L2__n node provides a logical 0 to transistor pair 102 and 103, which also make up an inverter circuit, and a logical 1 is output on as the d__out__n signal.

Referring back to FIGS. 1a and 1b, the completion detection circuits (NOR-gates 11, 21, 31, and 41) each output signals corresponding to their respective stages in the form of an acknowledge signal at a low state, which sends a message to the previous stage indicating that data has been received and forces the previous stage, which provided the data, to be reset. For example, in FIG. 1, the data__out and data__out__n signals are output from stage 20 to NOR-gate 21 which then provides the acknowledge signal n__ackn__1 to control element 12, thereby communicating with stage 10 that the data has been received at stage 20. More specifically, control element 12 corresponds to stage 10 and outputs the r0_n signal thereto which indicates receipt of the data by stage 20 and causes reset of stage 10. Further, a request inverter such as inverter 23 of FIG. 1 is connected to NOR-gate 21 and inverts the acknowledge signal n_ackn_1 output therefrom. This acknowledge signal is then sent as request signal req_2 to control element 32. In particular, the completion detection means Compl_Detect_1, i.e. NOR-gate 21 receives the d_out or d_out_n signals from stage 20. The output of gate 21 is sent as an acknowledge signal n_ackn_1 to control element 12 and as an input to inverter 23. The output of inverter 23 is then input to control element 32 as a request signal req_2 and the output of element 32 is then input as a corresponding r2_n reset signal to stage 30. In this case, the control element will take the pipeline stage out of precharge state and evaluate the input data. The complete detection means, NOR-gate 21, will pull the acknowledge signal n_ackn_1 low, i.e. to a logical 0. The control element 12 will then cause the pipeline stage 10 to be placed into a reset state.

The previously described sequence of events continues throughout all pipeline stages. The speed at which this "wave" travels through the pipeline depends upon how fast these circuits are designed. Those skilled in the art will understand how the speed of data transferred through the pipeline is proportional to the power usage of the circuit. Controlling the rate of data transfer through the pipeline stages will regulate power usage of the chip or macro.

Figure 3A:
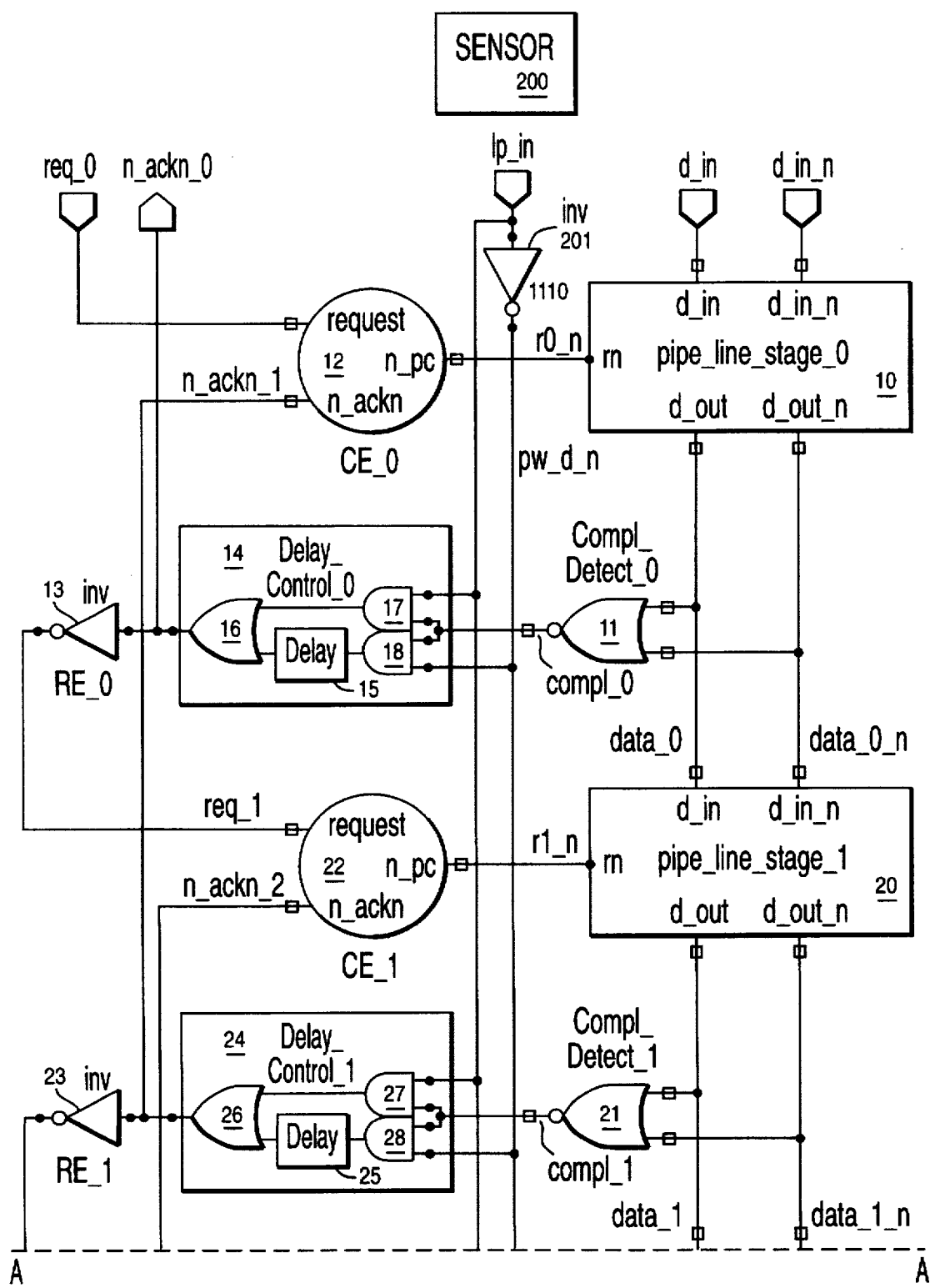
FIGS. 3a and 3b are circuit diagrams showing the delay circuitry of the present invention which regulates the frequency of the pipeline for self-timed circuits.
Figure 3B:
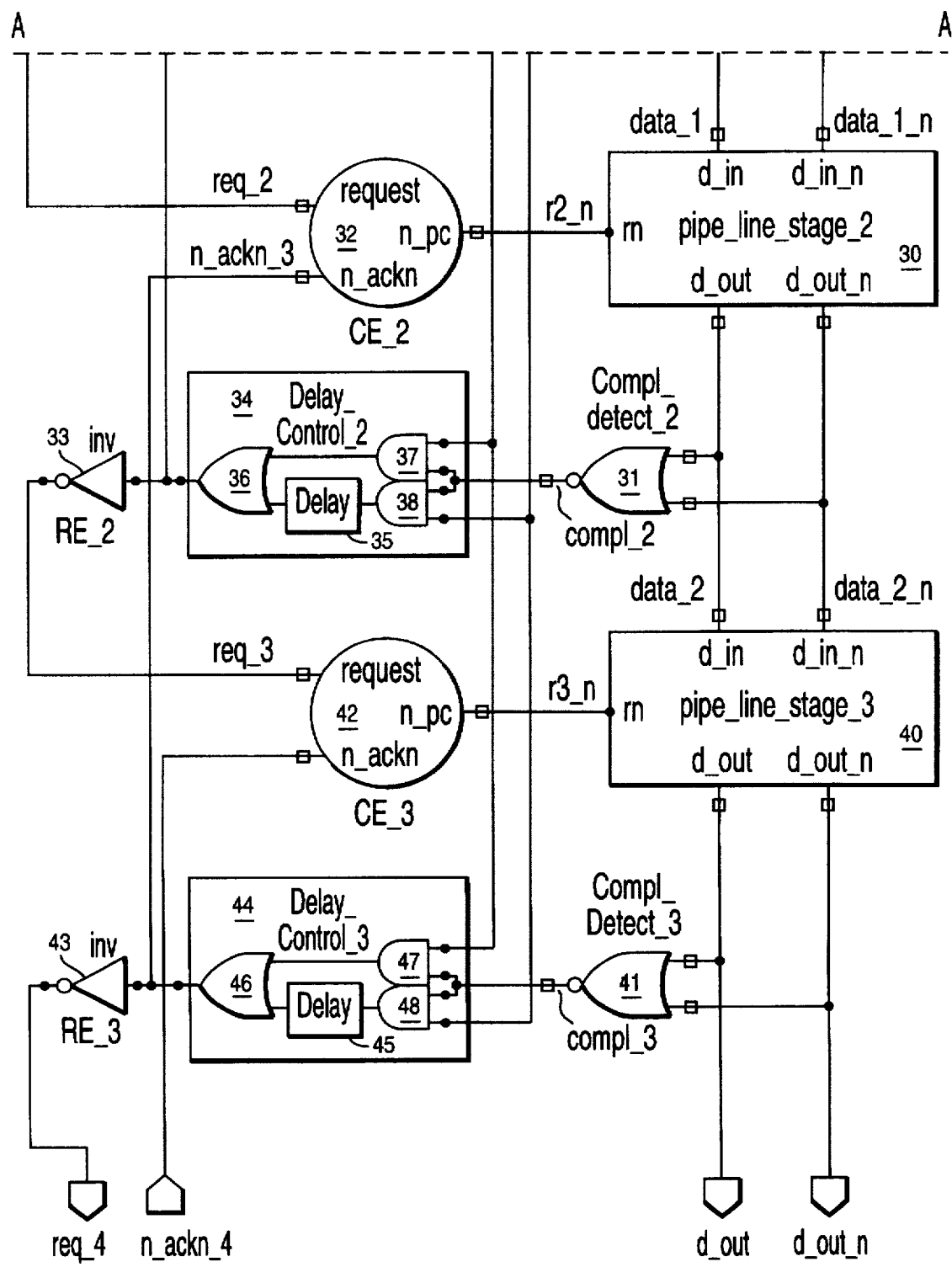

Referring to FIGS. 3a and 3b, the present invention is shown wherein a circuit is provided which permits the data transfer between stages to be regulated based upon power conditions of the chip. More particularly, the data transfer between stages can be slowed down in order to relieve excessive power conditions and then restored to high speed operation when power conditions permit. A sensor 200 is shown which determines when an excessive power condition exists. Sensors are well known in the art and may monitor such characteristics as heat, electrical current, or the like. Sensor 200 will output a signal based upon the characteristics being monitored, e.g. when the characteristic such as heat rises above a specific level. It should be noted that FIG. 3 is similar to FIG. 1 and includes stages 10 through 40 as well as NOR-gates 11, 21, 31 and 41 and inverters 13, 23, 33, and 43. In addition to sensor 200, an inverter 201 is shown which receives the output of sensor 200. Additionally, delay control blocks 14, 24, 34, and 44 are provided in the acknowledge signal path between stages 10, 20, 30 and 40. Delay blocks 14, 24, 34, and 44 are additional components shown in FIGS. 3a and 3b which are not shown in FIGS. 1a and 1b. These delay circuits will now be described, with the understanding that the remaining components shown in FIG. 3 operate in a similar manner as previously discussed with regard to FIGS. 1 and 2.

When sensor 200 detects an excessive power condition, a signal is output on lp_n signal line (low power signal). More particularly, when a low power signal is high (logical 1), operation commences normally as previously described, and the acknowledge signal is not delayed, i.e. high speed operation is enabled. However, when a high power situation is encountered, the lp_n signal is driven low and the acknowledge signals are steered from NOR-gates 11, 21, 32, 41 through the delay blocks 14, 24, 34, 44. This delay causes the forward propagation of data throughput between stages 10, 20, 30 and 40 to be slowed down such that the data rate is decreased and the frequency is lowered. Correspondingly, the power consumption is caused to drop, thereby reducing the heat level (or other characteristic such as electrical current) being monitored by sensor 200. No data is destroyed and as soon as the chip or macro cools down to a point acceptable to sensor 200, the high speed operation may commence when the lp_n signal is driven high.

More particularly, when a normal condition is present and the lp_n signal is high, a logical 1 will be input to AND-gates 17, 27, 37 and 47 of delay control blocks 14, 24, 34 and 44, respectively. Next, the completion signal, for example, compl_0 from NOR-gate 11 is also input to AND-gate 17 such that when both of these signals are high, a logical 1 is output from AND-gate 17 and input to OR-gate 16. Also, inverter 201 outputs a logical 0 to AND gates 18, 28, 38 and 48. This logical 0 ANDed with the compl_n signals from NOR gates 11, 21, 31 and 41, respectively, will cause the delay circuit to remain disabled. Thus, a normal acknowledge signal (n_ackn_0) will be presented to the previous pipeline stage (stage which provided the data) and to inverter 13, as described above.

However, when a high power condition exists the sensor 200 recognizes the condition and outputs a logical 0, or low signal to AND gates 17, 27, 37 and 47. Inverter 201 changes the logical 0 to a logical 1 and inputs this signal to AND-gates 18, 28, 38 and 48 of delay control blocks 14, 24, 34 and 44, respectively. Next, when the completion detect signal is output from a NOR-gate, such as NOR-gate 11, it is input to AND-gate 18 along with the low power signal pw_d_n from inverter 201. These signals are ANDed together and output to a delay 15 which then causes a predetermined amount of time to elapse before providing the signal to OR-gate 16. This OR-gate 16 will then provide the signal on the acknowledge signal lines to inverters 13, 23, 33 and 43, as previously discussed.

Basically, the present invention uses the output of sensor 200 to selectively enable the delay circuitry by steering the acknowledge signals, from the NOR-gates, between the high frequency path (e.g. through AND gate 17 and OR gate 16) and the low frequency, or delay path (e.g. through AND gate 18, delay 15 and OR gate 16). Each of control blocks 14, 24, 34 and 44 include a delay 15, 25, 35 and 45, respectively. Many different types of delay circuits can be used. One example is a sequence of series connected inverters which continuously change the binary value of the signal between 0 to 1. An even number of inverters in a delay circuit, such as delay 15, will provide an output signal identical to the input signal. Each of the delay control blocks 14, 24, 34 and 44 include OR-gates 16, 26, 36 and 46, respectively. These OR-gates are used to provide the completion signal from either AND-gate 17 (in the case of control delay block 14) when high speed operation is enabled or AND-gate 18, when a high power condition exists and the data transfer rate (frequency) is reduced, depending on the state of the output signal lp_n from sensor 200.

Thus, it can be seen how the present invention allows the dynamic regulation of power consumption in an integrated circuit by controlling the data transfer rate through various stages in a pipelined self-timed circuit in accordance with a sensed characteristic such as heat or electric current flow.

Although certain preferred embodiments have been shown and described, it should be understood that many changes and modifications may be made therein without departing from the scope of the appended claims.

We claim:

1. A circuit including a plurality of stages for performing data processing operations, comprising:
    means for monitoring a characteristic of said circuit and outputting a frequency control signal in accordance with said characteristic;
    means for continuously transferring data at a predetermined frequency directly between said stages and outputting an acknowledgement control signal to a subsequent stage based upon completion of said data processing operations at a previous stage; and means for regulating said predetermined frequency at which said data is continuously transferred directly between said stages, based upon said characteristic by performing a logical operation on said frequency control signal and said acknowledgement control signal to delay receipt of said acknowledgement control signal at said subsequent stage.

2. A circuit according to claim 1 wherein said means for transferring comprises means for providing said data from a first one of said stages to a second one of said stages, based upon receipt of said acknowledgement control signal from said second stage indicating completion of said data processing operations for previously transferred data.

3. A circuit according to claim 2 wherein said means for regulating comprises means for selectively delaying receipt of said acknowledgement control signal by said first stage.

4. A circuit according to claim 3 wherein said means for selectively delaying comprises:

means for receiving said frequency control circuit; and means for steering said acknowledgement control signal to said means for selectively delaying in accordance with a state of said frequency control signal.

5. A circuit according to claim 4 wherein said state of said frequency control signal changes based upon a relation of said characteristic to a predetermined level.

6. A circuit according to claim 5 wherein said characteristic comprises an amount of heat generated by said circuit.

7. A circuit according to claim 6 wherein said characteristic comprises an amount of electrical current required by said circuit.

8. A circuit according to claim 7 wherein said means for selectively delaying further comprises a series of interconnected inverter circuits.

9. A method for performing data processing operations by a circuit, including a plurality of stages, comprising the steps of:

monitoring a characteristic of said circuit and outputting a frequency control signal in accordance with said characteristic;

continuously transferring data at a predetermined frequency directly between said stages and outputting an acknowledgement control signal to a subsequent stage based upon completion of said data processing operations at a previous stage; and regulating said predetermined frequency at which said data is continuously transferred directly between said stages, based upon said characteristic by performing a logical operation on said frequency control signal and said acknowledgement control signal to delay receipt of said acknowledgement control signal at said subsequent stage.

10. A method according to claim 9 wherein said step of transferring comprises the step of providing said data from a first one of said stages to a second one of said stages, based upon receipt of said acknowledgement control signal from said second stage indicating completion of said data processing operations for previously transferred data.

11. A method according to claim 10 wherein said step of regulating comprises the step of selectively delaying receipt of said acknowledgement control signal by said first stage.

12. A method according to claim 11 wherein said step of selectively delaying comprises the steps of:

receiving said frequency control circuit; and steering said acknowledgement control signal to means for selectively delaying in accordance with a state of said frequency control signal.

13. A method according to claim 12 wherein said state of said frequency control signal changes based upon a relation of said characteristic to a predetermined level.

\* \* \* \* \*